United States Patent [19]

Shires

[11] Patent Number: 5,117,443
[45] Date of Patent: May 26, 1992

[54] METHOD AND APPARATUS FOR OPERATING AT FRACTIONAL SPEEDS IN SYNCHRONOUS SYSTEMS

[75] Inventor: Glen E. Shires, Santa Clara, Calif.

[73] Assignee: Lucid, Inc. (formerly Portable Computer), Dallas, Tex.

[21] Appl. No.: 435,181

[22] Filed: Nov. 13, 1989

[51] Int. Cl.⁵ ............................................. H04L 7/04
[52] U.S. Cl. .................................. 375/111; 375/119; 377/78; 377/107; 307/470
[58] Field of Search ............... 375/106, 111, 107, 119; 370/100.1, 105.3; 377/78, 104, 106, 107; 328/55, 72, 74, 75, 155; 307/470, 480

[56] References Cited

U.S. PATENT DOCUMENTS

| | | | |
|---|---|---|---|
| 3,518,377 | 6/1970 | Dworkin | 375/111 |
| 3,683,415 | 8/1972 | Lloyd et al. | 377/104 |
| 3,804,982 | 4/1974 | Brown | 375/111 |
| 4,398,103 | 8/1983 | Derzawiec et al. | 307/470 |
| 4,627,085 | 12/1986 | Yuen | 307/470 |

Primary Examiner—Benedict V. Safourek
Attorney, Agent, or Firm—Timmons & Kelly

[57] ABSTRACT

A synchronous digital system is disclosed which includes a system clock, a first and a second subsystem, each having a clock input, and a circuit for disabling the clock input to the second subsystem on a regular basis. The effective clock rate of the second subsystem is a fraction of the effective clock rate of the first subsystem.

3 Claims, 2 Drawing Sheets

METHOD AND APPARATUS FOR OPERATING AT FRACTIONAL SPEEDS IN SYNCHRONOUS SYSTEMS

TECHNICAL FIELD

This invention relates generally to methods and apparatus for synchronous digital logic systems. Traditionally, all logic in a synchronous system uses the same clock, and thus the same clock rate. If one portion of the system needs to run at a fast clock rate, then all portions of the synchronous system run at the same fast clock rate. Thus the entire synchronous portion of a design must use fast components, which are also generally more expensive, consume more power, and generate more unwanted radio emissions.

BACKGROUND ART

It is common in digital systems to have a master clock signal that controls the overall operation of the digital logic circuits used. In many systems, it is important that the various parts remain synchronized. This type of design is commonly referred to as a synchronous system. Typically this is achieved by having a single clock signal control the entire system, as is done in many systems.

In many systems, however, only a portion of the logic is required to be fast, and the remainder could potentially run slower. But the use of a single clock forces all the logic to be the same fast speed. The clock rate required by the fastest portion of the system may require the use of faster, more expensive components than otherwise would be necessary in the portions of the logic that could have been slower, but must be run faster to use the same clock. Also, because a portion of the logic is run faster than needed, the power consumption and unwanted radio emissions may also be greater.

To avoid these disadvantages, some designs are implemented as nearly synchronous, with two different clock signals that are nearly synchronized. Referring now to the drawing, and in particular to FIG. 1, a typical digital logic system is referred to generally by reference numeral 10. Digital logic system 10 includes a subsystem 12 of logic that is required to be run fast, and a subsystem 14 of logic that may be run more slowly. A circuit 16 provides the fast clock for subsystem 12 that requires it; this interconnecting clock signal 18 will be referred to as CLOCKA. CLOCKA is also used as an input to a frequency divider circuit 20 which generates an output signal 22, which will be referred to as CLOCKB, which is used to drive slower subsystem 14. All systems with this design suffer from a certain amount of time lag between CLOCKA and CLOCKB, a characteristic known as clock skew. Digital systems typically can not tolerate a significant amount of clock skew. Signals 24, which will be referred to as DATA, and 26, pass between subsystems of logic with different clock skew and can cause the logic to malfunction under certain common and typical conditions.

Referring now to FIG. 2, typical digital logic waveforms graphed as signal level variations over a period of time are referred to generally by reference numeral 30. These waveforms include a typical CLOCKA clock signal 32 which periodically changes from a high to a low state. CLOCKB clock signal 34 also periodically changes from a high to a low state, but at a slower rate, in the case illustrated, the rate is ½ of CLOCKA. Because the frequency divider circuit requires a certain amount of time from when the CLOCKA input changes to when it changes the CLOCKB output, there is a certain time lag 36 and 38 between the low-to-high transition of CLOCKA and the transition of CLOCKB. This time lag is referred to as the clock skew. In other systems it may be based on the high-to-low transition of CLOCKA, but the principle remains the same, the transitions of CLOCKB do not quite occur at the same time as the transitions of CLOCKA. A potential malfunction can occur when DATA signal 40 transition occurs as a result of CLOCKA, and its state is used by logic that is based on CLOCKB. Ideally, changes in the DATA signal would not be recognized until CLOCKB transition 42. However, because the DATA signal also requires a certain, but not absolutely predictable, amount of time to change from low-to-high after the CLOCKA input transition, it may be impossible to predict whether the DATA signal will be low or high at the CLOCKB low-to-high transition 44. When this happens, the digital logic that runs with CLOCKB and uses DATA as an input may act unpredictably, a condition known as metastability. Such an occurrence can cause a system malfunction.

Another concern is the other signal 26 in FIG. 1 which is output by the slower logic subsystem 14 and enters into the fast logic subsystem 12. Because of the clock skew, this signal has less time between the CLOCKB transition and the next CLOCKA transition, and therefore must be even faster than the signals in the fast logic subsystem so as to not cause a malfunction.

Prior art includes a variety of techniques to keep the clock skew to a minimum and thus reduce the chance of a malfunction. Such techniques include implementing the frequency divider so that the skew is minimum, such as using very fast logic dividers or a phase-lock-loop circuit. Other techniques rely on the use of delay lines or clock drivers to keep both clocks nearly in synchronization. In some cases, the technique may even reverse the time lag such that the CLOCKB transition is slightly before the CLOCKA transition, but this does not solve the problem, it only exchanges the two concerns of signals 24 and 26. All of these methods simply reduce clock skew, they do not completely eliminate it. Also, they are difficult to control over a wide-range of components, time and temperature and may require production-line tweaking or use costly and complex components, and often produce inconsistent clock skews.

DISCLOSURE OF INVENTION

The present invention eliminates clock skew by using only a single clock, but still provides a method in which to run certain portions of the digital logic system faster than others. This allows certain portions to be as fast as necessary, while keeping other portion slower to reduce cost, power consumption and/or reduce unwanted radio emissions.

In a synchronous system according to the present invention, all registers of the system are clocked by the same synchronous clock signal, but in subsystems where acceptable, the clock signal into the registers is disabled at specific times. This reduces the effective clock rate for the particular subsystems and thus increases the time available to those subsystems between each clock pulse.

In one arrangement, the clock to registers in a subsystem is disabled every other clock pulse, thus reducing the effective clock rate of the subsystem by half. In another arrangement, the clock is disabled two out of three clock pulses, creating an effective clock rate in the subsystem of one third the system clock. The clock can also be disabled three out of four clock pulses, creating an effective clock rate in a subsystem of one fourth the system clock or two out of five clock pulses, creating an effective clock rate of two-fifths of the system clock. Similar arrangements can implement any fractional relationship between the subsystem clock and the system clock.

A system, according to the present invention, thus has a clock and various subsystems that run at different rates but are all driven by the same clock in order to maintain a synchronous system. One or more of these subsystems also includes a mechanism for disabling the clock input on a regular basis. The effective clock rate of one subsystem is some fraction of the effective clock rate of the other subsystems.

In one arrangement of the present invention, the first subsystem includes a first set of registers driven by the clock and a first logic circuit designed to operate at the system clock rate, connected in a feedback arrangement from the output of the first set of registers to the input of the first set of registers. Similarly, the second subsystem includes a second set of registers driven by the clock and a second logic circuit designed to operate at a predetermined fraction of the system clock rate. The second logic circuit is, in one arrangement, connected in a feedback relationship from the output of the second set of registers to the input of the second set of registers.

The present invention provides a method of using low speed, low cost components in a portion of a high speed system without loss of system performance and without running those components faster than their rated speed.

These and other objects, advantages and features of this invention will be apparent from the following description taken with reference to the accompanying drawing, wherein is shown the preferred embodiments of the invention.

BEST MODE FOR CARRYING OUT THE INVENTION

Figure 1:
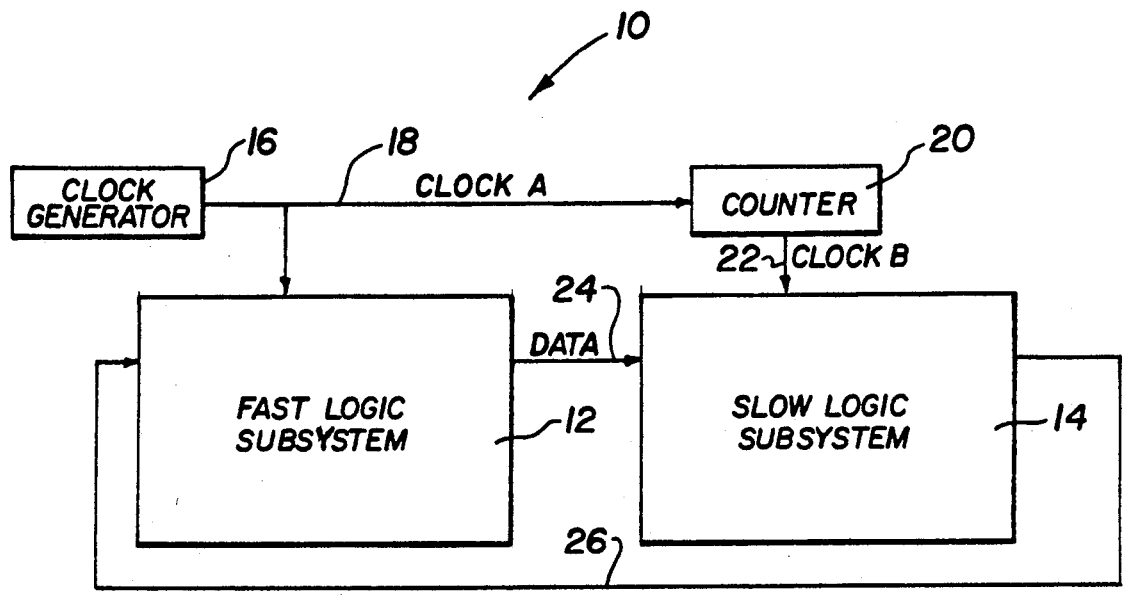
FIG. 1 is a block diagram representation of a typical synchronous digital logic system of the prior art.
Figure 2:
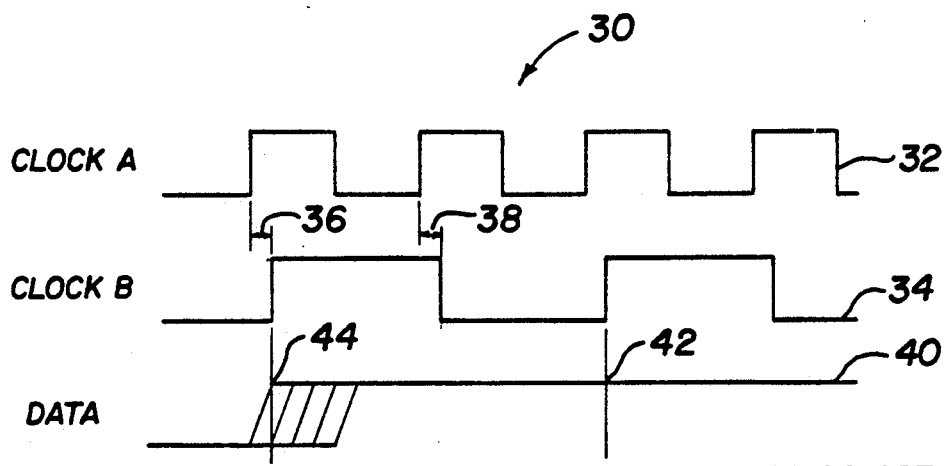
FIG. 2 is a waveform time-graph representation of the clock signals and register output from the system of FIG. 1.
Figure 3:
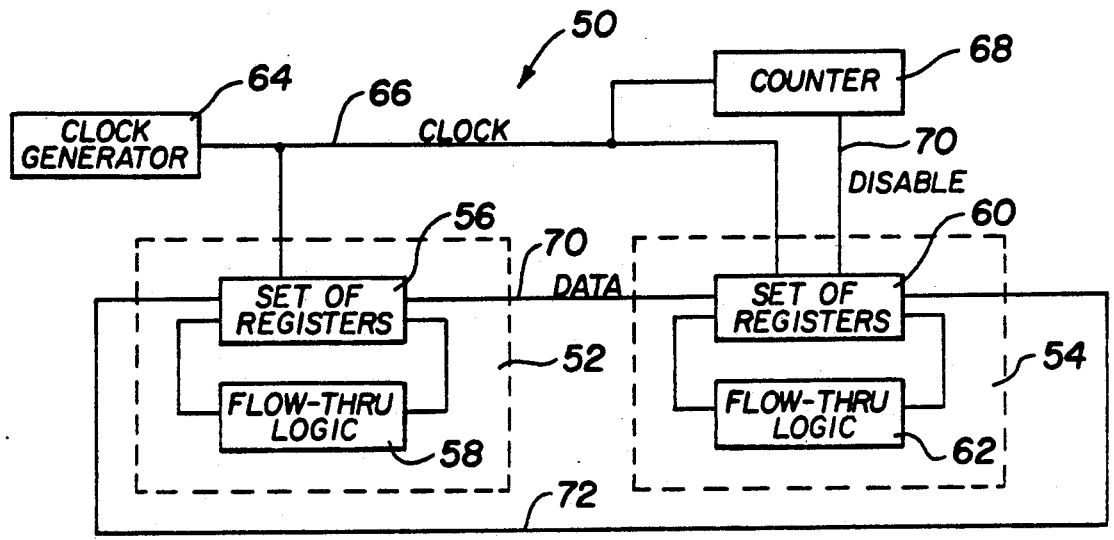
FIG. 3 is a block diagram representation of a typical synchronous digital logic system according to the present invention.

Referring now to the drawing, and in particular to FIG. 3, a typical digital logic system is referred to generally by reference numeral 50. Digital logic system 50 includes a subsystem 52 of logic that is required to be run fast, and a subsystem 54 of logic that may be run more slowly. Typically, fast logic subsystem 52 is implemented as a set of registers 56 and a flow-through logic circuit 58 that determines the next state for the registers and may have additional inputs and outputs. Similarly, slow logic subsystem 54 is implemented as a set of registers 60 and a flow-through logic circuit 62 that determines the next state for the registers and may have additional inputs and outputs.

A circuit 64 provides the system clock for both subsystems, this interconnecting clock signal 66 will be referred to as CLOCK. A counter logic circuit 68 also uses CLOCK signal 66 to derive a control signal 70 that goes high and low on a regular basis and will be referred to as DISABLE. This DISABLE signal 70 is used by set of registers 60 in the slower subsystem to indicate when the clock signal should be enabled (used) or disabled (ignored). The combination of the CLOCK and the DISABLE signal thus effectively slows down the rate at which set of registers 60 change and therefore reduces the speed required for the flow-through logic circuit 62 to respond.

In a preferred embodiment, the counter logic circuit 68 is implemented by a flip/flop circuit which toggles on and off with each low-to-high CLOCK transition. This generates a DISABLE signal that is one-half of the CLOCK rate, thus slower subsystem 54 runs at precisely half the speed of faster subsystem 52. Because the same CLOCK signal 66 is used by both subsystems, signals 70 and 72, which will be referred to as DATA, and may pass between subsystems of logic with different effective clock rates without risk of causing the logic to malfunction.

Figure 4:
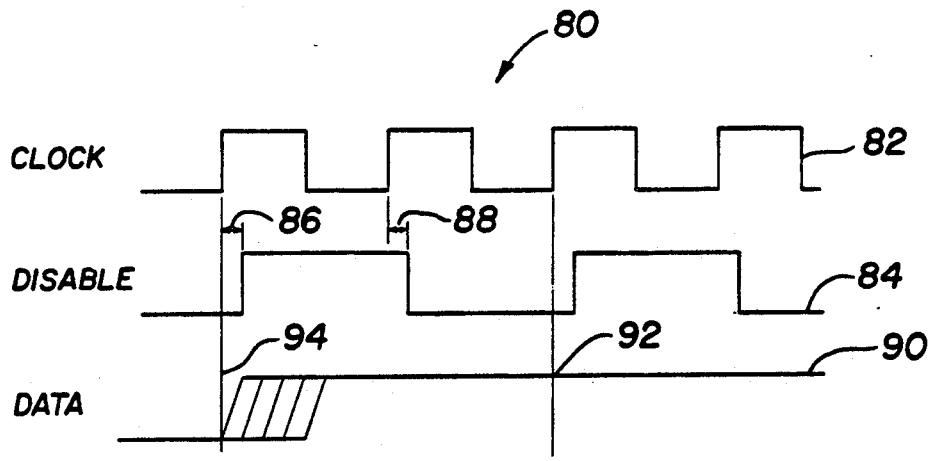
FIG. 4 is a waveform time-graph representation of the clock signals and register output from the system of FIG. 3.

Referring now to FIG. 4, digital logic waveforms for the preferred embodiment are graphed as signal level variations over a period of time and are referred to generally by reference numeral 80. These waveforms include typical CLOCK signal 82 which periodically changes from a high to a low state. DISABLE clock signal 84 also periodically changes from a high to a low state, but at a slower rate. In the case illustrated, the rate is ½ of CLOCK. Because the frequency divider circuit requires a certain amount of time from when the CLOCK input changes to when it changes the DISABLE output, there is a certain time lag 86 and 88 between the low-to-high transition of CLOCK and the transition of DISABLE. However, this time lag is not a problem because the CLOCK signal is used to initiate register changes in both subsystems. The DISABLE signal is not used in the fast subsystem. The DISABLE signal is used only as a reference in the slower subsystem to indicate when the CLOCK signal should be used and when it should be ignored. There is no potential of a malfunction when the DATA signal 90 transition occurs as a result of CLOCK, because its state is used by logic that is also based on CLOCK. Even though the DATA signal requires a certain amount of time to change from low-to-high after the low-to-high CLOCK input transition, it can easily be guaranteed to be stable before the next low-to-high CLOCK transition at 92. Unlike the prior art, there is no chance that the DATA signal will change before the low-to-high CLOCK input transition at 94 because the DATA signal will not even start to change until this transition occurs.

As a specific example of the preferred embodiment, counter logic 68 can be implemented as a 74F74 Flip/-Flop with its data input connected to its clock input. The register sets can both be implemented by several 74F378 register chips, with the CLOCK signal connected to their clock inputs. Set of registers 56 clock-enable is connected so that it is always enabled, and set of registers 60 clock-enable is connected to the DISABLE signal. Flow-through logic 58 and 62 in both subsystems can be implemented with flow-through PLDs (programmed logic device chips). If, in the specific example of the preferred embodiment, fast subsystem 52 is required to run at 50 Megahertz, then corresponding PLDs 58 would have to be fast enough to support a 50 Megahertz clock rate, however PLDs 62 corresponding to slow subsystem 54 would only be required to support a 25 Megahertz clock rate.

The preferred embodiment allows one subsystem to run at half the speed of another subsystem, but the general invention allows for any number of subsystems at any fractional speed relationship.

It is now clear to see that the present invention has several advantages over the synchronous systems of the prior art. The current invention provides a method to allow for various speed subsystems and permits the signals to pass easily from one subsystem to another without the possibility of metastability or malfunction. This removes the requirement from the entire system to run at the speed required by the fastest subsystem, allowing certain subsystems to run slower. These slower subsystems may use slower, less expensive components, consume less power, and generate less unwanted radio emissions.

It is easy to see that the present invention provides an extremely efficient method for synchronous systems and would be one well adapted for use on accelerator boards as well as in other synchronous systems.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims. As many possible embodiments may be made of the invention without departing from the scope thereof, it is to be understood that all matter herein set forth or shown in the figures of the accompanying drawing is to be interpreted as illustrative and not in a limiting sense.

I claim:

1. In a synchronous digital system, a combination including:

a clock generator;

a first set of registers driven by the clock generator, the registers having both an input for receiving data and an output for transmitting data;

a first logic circuit designed to operate at the clock rate, connected in a feedback arrangement from the output of the first set of registers to the input of the first set of registers;

a second set of registers driven by the clock generator, the registers having both an input for receiving data and an output for transmitting data;

a second logic circuit designed to operate at a predetermined fraction of the clock rate, connected in a feedback arrangement from the output of the second set of registers to the input of the second set of registers; and a circuit for disabling the clock provided for driving the second set of registers on a regular basis wherein the clock provided to the second set of registers which has not been disabled is at the predetermined fraction of the clock rate.

2. A synchronous system comprising in combination:

a clock generator;

at least two subsystems which are synchronous with each other, each including:

(a) a set of registers driven by the clock generator having both inputs for receiving data and outputs for transmitting data; and (b) a flow-through logic circuit that connects the register inputs as some function of the register outputs and possibly other external inputs and outputs; and at least one logic circuit to generate at least one disable signal on a regular basis wherein at least one set of subsystem registers is enabled and disabled on a regular basis.

3. A system according to claim 2 wherein the at least one logic circuit to generate at least one disable signal on a regular basis generates the at least one signal to have the time between a high transition and a low transition be multiple clock pulses such that each of the at least one subsystem is effectively clocked at a fractional rate of the clock generator.

* * * * *